United States Patent [19]
Sinha

[11] 3,823,369
[45] July 9, 1974

[54] TRANSFORMER TESTER FOR INDICATING SHORTED CONDITIONS IN POWER TRANSFORMERS

[75] Inventor: Ram Ratan Prasad Sinha, Athens, Ga.

[73] Assignee: Westinghouse Electric Corporation, Pittsburgh, Pa.

[22] Filed: Apr. 24, 1972

[21] Appl. No.: 247,166

[52] U.S. Cl..................... 324/51, 324/34 R, 324/55
[51] Int. Cl........................ G01r 31/02, G01r 31/06
[58] Field of Search ......... 324/51, 52, 54, 55, 34 R, 324/158 MG

[56] References Cited
UNITED STATES PATENTS

| | | | |
|---|---|---|---|
| 2,432,948 | 12/1947 | Thompson | 324/52 |
| 2,440,984 | 5/1948 | Summers | 324/34 R |
| 2,890,407 | 6/1959 | Huehn et al. | 324/158 MG X |
| 3,231,817 | 1/1966 | Bailey | 324/55 X |
| 3,307,102 | 2/1967 | Norkaitis | 324/51 |
| 3,354,387 | 11/1967 | Whaley et al. | 324/55 |
| 3,659,197 | 4/1972 | Alley et al. | 324/51 |

*Primary Examiner*—Gerard R. Strecker
*Attorney, Agent, or Firm*—J. R. Hanway

[57] ABSTRACT

Test apparatus for determining the condition of a transformer. An input winding is disposed around two magnetic cores. An output winding is wound around one core and is connected to an indicating lamp. Another output winding is wound around the other core and is connected to another indicating lamp and to the transformer being tested. A faulty transformer loads the magnetic circuit of one magnetic core and causes the flux to flow through the other magnetic core and change the brilliance of the indicating lamps.

1 Claim, 2 Drawing Figures

TRANSFORMER TESTER FOR INDICATING SHORTED CONDITIONS IN POWER TRANSFORMERS

BACKGROUND OF THE INVENTION

1. Field of the Invention

This invention relates, in general, to apparatus for testing transformers and, more specifically, to apparatus for detecting faulty distribution transformers.

2. Description of the Prior Art

Faulty distribution transformers are hazardous to linemen who are attempting to correct the fault. Several deaths have been attributed to the failure of linemen to recognize that a distribution transformer was faulty. A fault in a distribution transformer usually causes the high voltage line cutout, which is protecting the transformer, to operate and disconnect the power line from the transformer. When the lineman reaches the faulty transformer, he is not always certain that the cutout operated because of a faulty distribution transformer or because of a large overload on the low voltage distribution line. The lineman may be working under adverse conditions in attempting to reactivate the circuits as soon as possible to reduce the time of the power interruption.

Invariably, some linemen refuse the cutout and energize the transformer without knowing that a fault exists in the transformer. Depending upon the nature of the fault, the condition of the cutout, the condition of the transformer when reenergized, and upon other factors, a dangerous situation may develop. The transformer fault, which normally is caused by a shorted or partially shorted winding, produces a considerable amount of heat and gas due to arcing within the transformer. The high pressure generated by the gas is likely to rupture the transformer casing structure and spray flaming oil on nearby objects. It is desirable, therefore, that the lineman know the condition of the transformer before refusing the cutout and closing the circuit. If he finds that it is faulty, it can be replaced before power is reapplied.

A satisfactory transformer tester for detecting faults must not damage good transformers or present a safety problem in itself when connected, for testing, to a directly shorted transformer winding. It is desirable, and it is an object of this invention, to provide a transformer tester which may be safely used by line crews to determine the condition of a distribution transformer before it is reenergized.

SUMMARY OF THE INVENTION

There is disclosed herein a new and useful transformer tester suitable for field checking the condition of distribution and similar transformers. The tester includes, in a preferred embodiment thereof, two separate magnetic cores each having a common input winding and separate output windings. The input winding is connected to a source of alternating voltage. One of the output windings is connected to an indicating lamp. The other output winding is connected to another indicating lamp and to the transformer being tested. If the tested transformer is free of faults, it will not appreciably load the output winding to which it is connected. If the tested transformer is faulty, it will load the output winding to which it is connected and effectively increase the reluctance of the magnetic core on which this output winding is disposed. Consequently, the indicating lamps connected to the output windings change in brilliance. Such a brilliance change is an indication that the transformer is faulty. Since the loaded output winding is disposed around the core having only a small flux therein when the transformer is faulty, the induced voltage from the tester is insufficient to make the tested transformer hazardous.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
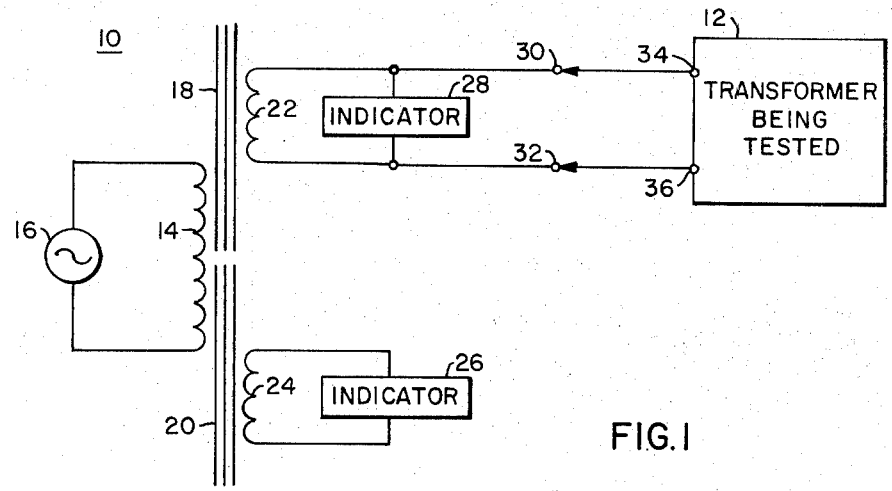
FIG. 1 is a schematic diagram illustrating a general connecting arrangement for a tester constructed according to the teachings of this invention.

Throughout the following description, similar reference characters refer to similar members in all figures of the drawing.

Referring now to the drawing, and FIG. 1 in particular, there is shown a transformer tester 10 connected to a transformer 12 for the purpose of determining the condition of the transformer 12. An input winding 14 is connected to a source of alternating voltage, such as a generator 16. The input winding 14 is inductively coupled to a pair of magnetic cores 18 and 20. The voltage impressed across the winding 14 results in an induced flux in the magnetic cores 18 and 20. The quantity of the induced flux is dependent upon the reluctance of the magnetic paths provided by the magnetic cores 18 and 20. When the reluctance of the magnetic core 18 is higher than the reluctance of the magnetic core 20, more of the flux which is produced by the winding 14 flows in the magnetic core 20 than in the magnetic core 18. Similarly, when the reluctance of the magnetic core 18 is lower than the reluctance of the magnetic core 20, more of the flux which is produced by the winding 14 flows in the magnetic core 18 than in the magnetic core 20.

Output windings 22 and 24 are inductively coupled to the magnetic cores 18 and 20, respectively. The output winding 24 is connected to an indicator 26 which indicates the relative amount of flux flowing in the magnetic core 20. Preferably, the indicator 26 is a relatively high impedance device which draws only a small amount of power from the winding. As a result, the loading effect of the indicator 26 does not substantially affect the reluctance of the magnetic path provided by the magnetic core 20. A suitable indicator would be a meter or lamp which provides an indication of the voltage induced into the winding 24 by the flux flowing in the magnetic core 20.

The output winding 22 is connected to an indicator 28 and, through the terminals 30 and 32, to the transformer 12 which is being tested. The indicator 28 may be constructed similar to the indicator 26, that is, a relatively high impedance means for indicating the amount of flux which is flowing in the magnetic core 18. The terminals 34 and 36 of the transformer 12 are connected to a winding of the transformer 12. In most testing applications, the low voltage winding of the transformer 12 will be used for the testing. However, the high voltage winding may also be used. A fault in one winding would be reflected into the other winding.

An alternating flux is induced into the magnetic cores 18 and 20 by the input winding 14. The magnetic cores 18 and 20 are preferably the same size, that is, the same material, path lengths, and cross-sectional area. The tester will work, however, with some deviation between the magnetic properties of the two magnetic cores. The flux induced into each winding is equal provided the loading effects of the output windings 22 and 24 are equal. When the transformer 12 is not faulty, the load on the winding 22 is substantially low. Ordinarily, the transformer will draw only enough power to counteract the losses of the transformer 12 when the other winding is open-circuited. Thus, with the loading of the transformer 12 when not faulty being negligible on the winding 22, substantially equal fluxes flow in the magnetic cores 18 and 20. This is indicated by the indicators 26 and 28. Therefore, when this condition is indicated, it is indicative of a good transformer.

When the transformer 12 has a fault condition which causes it to appear as a relatively low impedance at the terminals 34 and 36, the output winding 22 places a substantial load on the flux in the magnetic core 18. Consequently, the magnetic path provided by the magnetic core 18 has a relatively high reluctance. Since the reluctance of the magnetic core 18 is higher than the reluctance of the magnetic core 20, most of the flux which is produced by the input winding 14 will flow in the magnetic core 20. Thus, the indicator 28 will show a low induced voltage in the winding 22, which is indicative of a faulty transformer 12. Since the voltage induced into the winding 22 is low when the transformer 12 is faulty, excessive current will not flow into the transformer 12 even under short-circuit conditions.

When a faulty transformer is connected to the winding 22, the indicator 26 indicates that a greater amount of flux is circulating in the magnetic core 20 than would be if the transformer 12 was not faulty. This is another indication of a faulty transformer. Although the indication of the indicator 28 would normally be sufficient in itself to indicate a faulty transformer, the use of the additional indicator 26 is desirable. Indicator 26 provides a substantially reliable indication that power is being supplied to the transformer tester 10 although the indicator 28 may not so indicate. It is conceivable that the indicator 26 may be connected to the input winding 14 to indicate that power is being supplied to the transformer tester 10. Thus, a faulty transformer may be detected by an indicator connected to either of the output windings 22 or 24 or by two indicators each connected to one of the output windings 22 or 24.

Figure 2:
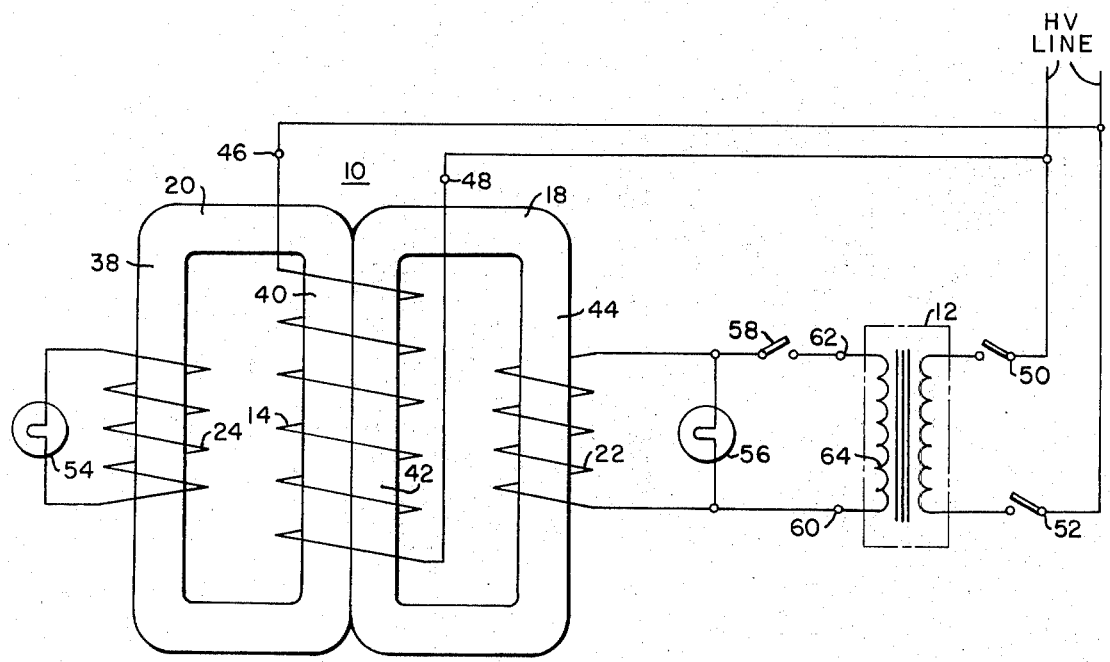
FIG. 2 is a schematic diagram illustrating a particular connecting arrangement for testing distribution transformers.

FIG. 2 is a schematic diagram illustrating the physical and electrical construction of a specific embodiment of this invention. The transformer tester 10 includes the magnetic cores 18 and 20 which provide substantially similar but separate closed paths for magnetic flux. They may be constructed of wound steel strips to form laminated structures. The magnetic core 20 includes the legs 38 and 40 and the magnetic core 18 includes the legs 42 and 44. The legs 40 and 42 are positioned relatively close to each other, although a relatively large separation distance will not materially alter the operation of the tester.

An input winding 14 is wound around the legs 40 and 42 of the magnetic cores 20 and 18. The input winding terminals 46 and 48 are connected to the high voltage line terminals 50 and 52 to provide a source of alternating voltage to energize the input winding 14. An output winding 24 is wound around the leg 38 of the magnetic core 20 and is connected to a lamp 54 having a suitable rating. An output winding 22, substantially similar to the winding 24, is wound around the leg 44 of the magnetic core 18. The winding 22 is connected to a suitably rated lamp 56 and to the switching means 58 and the terminal 60 of the transformer 12 which is being tested. Terminals 60 and 62 are connected to the low voltage winding 64 of the transformer 12, however, as discussed concerning the circuit shown in FIG. 1, other windings of the transformer being tested may be used.

With power applied to the input winding 14 and with the switch 58 open, substantially the same amount of flux flows in each of the magnetic cores 18 and 20. Consequently, the induced voltage in the windings 22 and 24 is substantially equal and the lamps 54 and 56 light with substantially equal brilliance. This gives the person using the tester 10 a positive indication that the necessary flux is being circulated in the magnetic cores 18 and 20.

When the switch 58 is closed, the transformer 12 is connected into the circuit of the tester 10. If the transformer 12 is not faulty, it will require only a nominal amount of steady state power to keep it energized. Although the initial magnetizing or in-rush transformer current may cause the lamps to change their brilliance slightly for a very short period of time, the lamps 54 and 56 will remain substantially at the brilliance they exhibited before the transformer 12 was connected into the circuit.

If a faulty condition exists in the transformer 12 which would be hazardous, the winding 22 is loaded when the switch 58 is closed. This shifts nearly all of the flux induced by the winding 14 to the magnetic core 20. Consequently, the lamp 56 reduces considerably in brilliance and the lamp 54 increases considerably in brilliance. This gives the person making the test a positive indication that the transformer is faulty and that it should not be reenergized.

With the tester disclosed herein, a lineman may determine the feasibility of reconnecting a disconnected distribution transformer to the high voltage power line. The transformer testing apparatus disclosed herein may also be used for testing other types of transformers. Since numerous changes may be made in the above-described apparatus and different embodiments of the invention may be made without departing from the spirit thereof, it is intended that all of the matter contained in the foregoing description or shown in the accompanying drawing, shall be interpreted as illustrative rather than limiting.

I claim:

1. A transformer tester suitable for field testing a winding of a transformer for shortcircuits, said tester comprising first and second magnetic cores, an input winding disposed around said first and second magnetic cores, means for connecting said input winding to an alternating-current source for inducing magnetic flux into said first and second magnetic cores, a first output winding disposed around said first magnetic core to provide a voltage responsive to the flux in said first magnetic core, a first lamp connected across said first output winding to provide an indication of the voltage in said first output winding, thereby indicating when the tester is energized by the alternating-current source, a second output winding disposed around said second magnetic core to provide a voltage responsive to the flux in said second magnetic core, a second lamp connected across said second output winding to provide an indication of the voltage in said second output winding, and means for connecting said second output winding to the winding of the transformer being tested, with a substantial increase in the brightness of said first lamp and a substantial decrease in the brightness of said second lamp, when the winding of the transformer is connected to said second output winding, indicating that the transformer winding is short-circuited.

* * * * *